J. S. CULVER.
Horse Hay-Fork.
No. 70,700.
Patented Nov. 12, 1867.
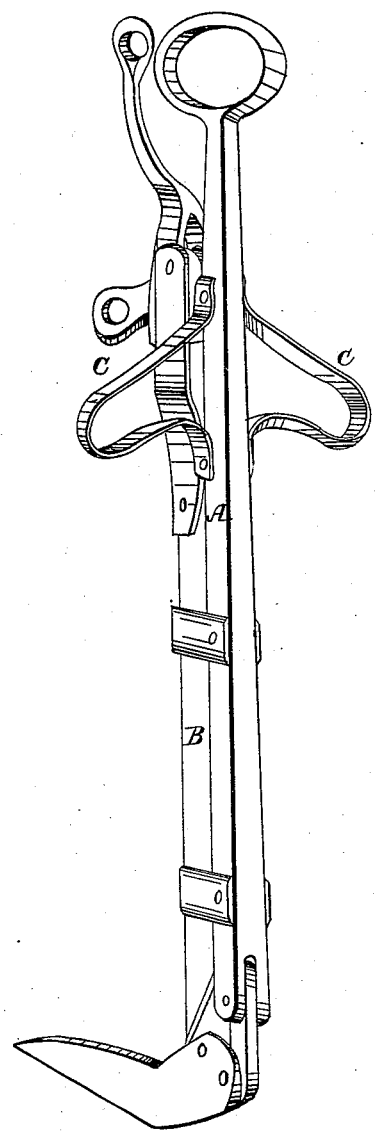
Witnesses.
Frank Wright
Chs. W. Bannister
Inventor.
James S Culver

United States Patent Office.

JAMES S. CULVER, OF SPRINGPORT, NEW YORK.

Letters Patent No. 70,700, dated November 12, 1867.

---

IMPROVEMENT IN HORSE HAY-FORKS.

---

The Schedule referred to in these Letters Patent and making part of the same.

---

TO ALL WHOM IT MAY CONCERN:

Be it known that I, JAMES S. CULVER, of the town of Springport, in the county of Cayuga, and State of New York, have invented a new and useful Improvement in Hay-Elevating Forks; and I do hereby declare that the following is a full, clear, and exact description of the construction and operation of the same, reference being had to the annexed drawings, making a part of this specification, which shows a rear view of a hay-elevating fork with my improvement attached thereto, my improvement being marked in red lines.

A is the main stem of the fork; B is the sliding or movable stem of the fork; C C are shoulder-pieces attached to the said main stem A, for the purpose hereinafter described.

The nature of my invention consists in constructing and attaching a shoulder-piece to the sides of said main stem, for the purpose of compressing and holding the hay to be lifted by the fork in its place; and also to regulate the depth to which such fork shall penetrate into the mass of hay from which the portion is to be lifted. The fork, in all other respects, may be constructed in any of the usual modes, as my improvement is not confined to any particular pattern of fork.

I make of metal a shoulder-piece, which may be made in the form of a triangle, or of any other convenient form, as shown in the drawing C. I attach the lower part thereof firmly to one side of the said main stem, and sufficiently far above the point thereof, so that the quantity of hay desired to be lifted at one operation may be compressed below said shoulder. I then attach the other point of said shoulder-piece C to the same side of said main stem, and in line directly above where the lower point thereof was attached, as is shown in the drawing. I attach a similar shoulder-piece, C, to the opposite side of said main stem, in the same manner and at the same height, and, if deemed necessary, a like shoulder-piece may be attached in like manner, and at the same height, to the rear side of said stem, although I have found in practice that two shoulder-pieces, one upon each of the opposite sides of said stem, as shown in the drawing, have proved sufficient in ordinary hay. However, should the hay be very short and loose, the third shoulder-piece would be beneficial.

The operation of the fork with my improvement attached is as follows: As the spear of the fork penetrates the mass of hay, the shoulder-pieces soon reach the top of the mass, and begin to press thereupon, and as the spear is still further pressed into the mass, the pressure of the shoulders upon the hay increases, so that when the spear end of the fork is turned outwards, the mass of hay has become so firmly compressed as that no part thereof will spill or scatter as it is elevated, and I thus find in practice that short hay, lying so loosely that the fork, without my improvement, would lift but a very small quantity, when tested with a fork with my improvement attached thereto, would lift in masses as large as was desired. I also contemplate using my improvement by attaching the shoulder-pieces to a hollow square or sleeve of metal, through which the main stem of the elevating-fork may freely pass, and securing said sleeve in any desired position upon said stem by an eccentric or other suitable fastener, and thus be able to regulate the quantity of hay to be lifted at one operation, according to the will of the operator.

Having thus fully described my invention, and the manner in which I contemplate using the same, what I claim therein as new, and desire to secure by Letters Patent, is—

The attaching of shoulder-pieces to the main stem of the hay-elevating fork, substantially as and for the purpose described.

JAMES S. CULVER.

Witnesses:
FRANK WRIGHT,
CHAS. A. BANNISTER.